(12) United States Patent
Sethi

(10) Patent No.: US 9,529,866 B2
(45) Date of Patent: Dec. 27, 2016

(54) EFFICIENTLY HANDLING LARGE DATA SETS ON MOBILE DEVICES

(75) Inventor: Raman Sethi, Fremont, CA (US)

(73) Assignee: SYBASE, INC., Dublin, CA (US)

( * ) Notice: Subject to any disclaimer, the term of this patent is extended or adjusted under 35 U.S.C. 154(b) by 612 days.

(21) Appl. No.: 12/973,814

(22) Filed: Dec. 20, 2010

(65) Prior Publication Data

US 2012/0159393 A1  Jun. 21, 2012

(51) Int. Cl.
*G06F 3/0485* (2013.01)
*G06F 17/30* (2006.01)

(52) U.S. Cl.
CPC ....... *G06F 17/30554* (2013.01); *G06F 3/0485* (2013.01); *G06F 3/04855* (2013.01); *G06F 17/30902* (2013.01)

(58) Field of Classification Search
CPC ...... G06F 3/048; G06F 15/177; G06F 9/4446; G06F 17/30873; G06F 3/0237; G06F 3/0485; G06F 3/04855
USPC ........ 715/812, 738, 708, 773, 827, 784–787
See application file for complete search history.

(56) References Cited

U.S. PATENT DOCUMENTS

| | | | |
|---|---|---|---|
| 5,165,016 A | | 11/1992 | Takahashi |
| 5,495,566 A | * | 2/1996 | Kwatinetz ............. G06F 3/0485 345/684 |
| 5,515,531 A | * | 5/1996 | Fujiwara et al. |
| 5,757,381 A | * | 5/1998 | Shoji ..................... G06F 3/0613 345/684 |
| 5,867,729 A | * | 2/1999 | Swonk .............................. 710/8 |
| 6,359,572 B1 | * | 3/2002 | Vale ................................ 341/23 |
| 7,426,696 B1 | * | 9/2008 | Hwang .............. H04N 5/44543 348/E5.105 |

(Continued)

FOREIGN PATENT DOCUMENTS

| | | |
|---|---|---|
| WO | WO 03/036457 A2 | 5/2003 |
| WO | WO 2004/084608 A2 | 10/2004 |

OTHER PUBLICATIONS

International Search Report and Written Opinion for International Application No. PCT/US2011/065452, Korean Intellectual Property Office, Republic of Korea, mailed on Sep. 3, 2012, 9 pages.

(Continued)

*Primary Examiner* — Doon Chow
*Assistant Examiner* — Le Nguyen
(74) *Attorney, Agent, or Firm* — Sterne, Kessler, Goldstein & Fox P.L.L.C.

(57) ABSTRACT

A system, method, and computer program product are provided for efficiently fetching and displaying large datasets on mobile devices, such as devices running the iPhone™ operating system. The method fetches data for a mobile device from a server and displays a plurality of data rows in a ListView within a user interface on the mobile device. The method stores primary keys on the mobile device until their corresponding data rows are to be displayed. The method reacts to user inputs such as scrolling actions and touch screen gestures to efficiently fetch and display list view subsets of large datasets. The method facilitates quick response times when navigating through large lists of data on a mobile device by: fetching displayable or visible rows of data in a data list view, preloading the visible rows on the mobile device; and binding the visible rows to user interface elements on the mobile device.

19 Claims, 9 Drawing Sheets

(56) References Cited

U.S. PATENT DOCUMENTS

| | | | |
|---|---|---|---|
| 8,103,970 B1* | 1/2012 | Allen | G06F 3/0482 715/738 |
| 2004/0104944 A1* | 6/2004 | Koay et al. | 345/827 |
| 2004/0139235 A1* | 7/2004 | Rashid et al. | 709/248 |
| 2004/0203959 A1* | 10/2004 | Coombes | H04M 1/72552 455/466 |
| 2004/0230571 A1* | 11/2004 | Robertson | 707/3 |
| 2005/0058353 A1* | 3/2005 | Matsubara | 382/233 |
| 2006/0026521 A1* | 2/2006 | Hotelling et al. | 715/702 |
| 2006/0259504 A1 | 11/2006 | Kusu | |
| 2007/0002018 A1* | 1/2007 | Mori | 345/158 |
| 2007/0067305 A1 | 3/2007 | Ives | |
| 2007/0198476 A1* | 8/2007 | Farago | G06F 3/0485 |
| 2007/0209017 A1* | 9/2007 | Gupta | G06F 3/0485 715/781 |
| 2008/0082939 A1* | 4/2008 | Nash et al. | 715/784 |
| 2008/0147416 A1* | 6/2008 | Hill et al. | 705/1 |
| 2009/0083661 A1* | 3/2009 | Blinnikka | G06F 17/20 715/787 |
| 2009/0106687 A1* | 4/2009 | De Souza Sana et al. | 715/784 |
| 2009/0249235 A1* | 10/2009 | Kim | G06F 3/0481 715/765 |
| 2009/0288035 A1* | 11/2009 | Tunning | G06F 3/0485 715/784 |
| 2009/0293007 A1* | 11/2009 | Duarte | G06F 3/0481 715/767 |
| 2010/0083155 A1* | 4/2010 | Farago | G06F 3/0485 715/769 |
| 2010/0088640 A1* | 4/2010 | Reay | G06F 3/0485 715/828 |
| 2010/0100849 A1* | 4/2010 | Fram | 715/835 |
| 2010/0162126 A1* | 6/2010 | Donaldson et al. | 715/738 |
| 2010/0269038 A1 | 10/2010 | Tsuda | |
| 2010/0313002 A1* | 12/2010 | Hamid | G06F 9/44521 712/248 |
| 2011/0083082 A1* | 4/2011 | Gottwald | G06F 17/30899 715/744 |
| 2011/0090255 A1* | 4/2011 | Wilson et al. | 345/647 |
| 2011/0119615 A1* | 5/2011 | Cisler | G06F 9/4443 715/772 |
| 2011/0202847 A1* | 8/2011 | Dimitrov | G06F 3/0481 715/738 |
| 2012/0011430 A1* | 1/2012 | Parker | G06F 3/0485 715/234 |
| 2012/0084343 A1* | 4/2012 | Mir | H04L 29/12066 709/203 |
| 2012/0293559 A1* | 11/2012 | Tomaru | G06T 17/05 345/684 |
| 2013/0326398 A1* | 12/2013 | Zuverink | G06F 3/048 715/784 |

OTHER PUBLICATIONS

Extended European Search Report from Application No. 11851814.1, dated Jan. 4, 2016, 10 pages.

* cited by examiner

EFFICIENTLY HANDLING LARGE DATA SETS ON MOBILE DEVICES

FIELD OF THE INVENTION

The present invention relates generally to mobile communications and, more particularly, to fetching and presenting information using a mobile device.

BACKGROUND OF THE INVENTION

Users of mobile devices without native database applications or sufficient local storage capacity are often unable to fetch and display large datasets without experiencing degraded response times. Although response time is critical to the usefulness of user interfaces (UIs), UIs for current mobile operating systems and platforms are unable to display list views of large datasets (i.e., datasets with tens of thousands of records) without subjecting users to delays as they attempt to navigate the list views. This problem is compounded when 'hybrid' datasets are fetched. Such hybrid datasets may comprise a combination of textual and multimedia data such as graphics, audio, and video. The inability of mobile devices to effectively fetch and display large datasets results in a lack of responsiveness of mobile device user interfaces, particularly when the datasets include graphics images and icons.

The emergence and development of mobile computing devices allows users to access pertinent information from almost anywhere, without needing to be bound to a specific geographic location. Such users can use these devices to view relevant data while, for example, traveling from one physical location to another. This is particularly advantageous in a business environment, where mobile devices continue to become prevalent. Many business users from diverse occupations rely on the devices to access data from large datasets in the field. Some subset of enterprise and application databases is commonly downloaded, or synchronized, to these mobile devices for viewing in user interfaces on the mobile devices.

While the relative small size of a mobile device aids in portability, the size may also prove to be a hindrance for some users and applications, particularly for enterprise mobile users who need to fetch and view data from large datasets.

Despite advances in mobile technology, mobile devices typically have greater limitations on memory capacity, data storage capacity, central processing unit (CPU) capacity, and networkability than workstation computers. Due to these limitations, some mobile device operating platforms with touch screen interfaces, such as the iPhone™ operating system (OS) developed by Apple Inc., the Android platform from Google Inc.; and the Blackberry OS from Research In Motion ("RIM") and similar mobile operating systems cannot display large dataset comprising many records (i.e., rows of data) in a single view. These limitations present challenges when different portions of large datasets are to be fetched and displayed in response to user scrolling or navigation inputs within a user interface (UI) of a mobile device. Given the versatility of mobile devices, it is desired to implement a means by which these mobile devices can quickly fetch and display subsets of large datasets from server-side databases and efficiently display these subsets in the context of potentially intermittent, unreliable, occasionally-connected, variable speed (quality of service), or temporarily-unavailable networking capabilities.

As more and more enterprise applications perform large database synchronizations from an application server to mobile devices, mobile device user interfaces are called upon to efficiently display larger and larger datasets. Despite advances in the central processing units (CPUs), memory capacity, and storage capacity realized with newer mobile devices, mobile applications consuming large amounts of memory to handle large datasets still degrade the user experience on mobile platforms. For example, traditional techniques for displaying a list view of a dataset including ten thousand icons that perform adequately on servers, workstations, and personal computers cause memory and CPU performance issues when implemented on mobile devices. Some mobile operating systems (OSs) attempt to address these issues by flagging application processes that are consuming large amounts of memory or CPU resources so additional resource allocation is made available to other applications. Such flagging can prevent the applications from consuming disproportionate amounts of memory. However, a drawback of this technique is that responsiveness of the flagged applications is degraded.

A traditional technique for displaying data from large datasets on mobile platforms relies on 'just in time' data retrieval whereby rows of data to be displayed are fetched as a user navigates to the data. However, fetching data rows as a user scrolls or otherwise navigates to data rows often results in unacceptably slow UI response times due to delays associated with such just in time fetching in wireless environments.

A conventional technique for displaying large datasets on a mobile device involves retrieving and storing the large dataset locally on the mobile device. However, one drawback of this technique is that many mobile devices lack native database applications and/or sufficient local storage capacity to locally store and display large datasets. Even with a relatively fast local native database, this technique can result in stale data being displayed without resource intensive data synchronization to keep the dataset up to date on the mobile device. Another disadvantage to this technique is a UI delay experienced by users while the large dataset is retrieved and stored.

Despite increased database performance achievable through indexing and query optimization, traditional database implementations in mobile environments are unable to scale up to handling large datasets without noticeable performance issues such as UI delays and lags.

Traditional techniques make it difficult for users to browse or view large data lists that extend beyond the current viewing area of a mobile device screen. Such a limitation makes traditional techniques inapplicable to applications that need to display long data lists on small display screens (e.g. mobile devices).

Accordingly, what is desired is the ability to fetch and quickly display subsets of data from large data sets on mobile devices in an efficient and economical manner.

What is further needed are systems, methods, and computer program products for reacting to a user's scrolling and touch gestures in an mobile device interface and dynamically displaying only what fits the mobile device screen at any point while browsing data. As mobile devices are often resource constrained, what is further needed is the ability for efficient data fetching that use minimal resources so that the systems and methods scale up to handle very large datasets. What is further needed is the ability to react to user touch gestures within a touch screen user interfaces and dynamically display only what fits into a mobile device's screen at any point while browsing data.

SUMMARY OF THE INVENTION

Embodiments of the invention include methods, systems, and computer program products for efficient fetching of data to be displayed within a user interface (UI) of a client device, such as, but not limited to mobile devices. The methods, systems, and computer program products handle large datasets without storing the entire dataset on a client device. An embodiment of the invention loads data viewable by a user at any time and binds the data to UI elements. As the user scrolls, navigates, or gestures in any direction (i.e., up/down) within a data list view to traverse a large dataset, embodiments of the invention dynamically fetch additional pages of data so as to give the user the impression that the additional pages are already loaded and available to be displayed/viewed. For example, 'scroll behind' and 'scroll ahead' data pages are fetched when user navigates to a currently-viewed page. Such scroll ahead and scroll behind pages include fetched data corresponding to one page of data prior to and after the currently viewed page. The methods, systems, and computer program products build a 'ListView' comprising visible data rows and a logical data window by invoking modules. In an embodiment, the modules reside on a mobile device. The modules fetch visible data rows and additional pages needed for the logical data window from a large dataset resident on server. The dataset is akin to a result set after a search or query is executed and the result set fetched. In an embodiment, the result set only has primary keys of records needed to be displayed top to bottom in a UI display of a client device. The fetched data corresponds to primary keys stored locally on the mobile device. The data fetching and displaying methods, systems, and computer program products serve as a mechanism to efficiently fetch portions of large datasets from servers as users of mobile devices navigate through a list view of the datasets.

Embodiments of the invention dissect the behavioral elements of hand-eye coordination behind a user interface. This dissection attempts to understand how the hand (in the case of a touch screen interface) or another input device such as, but not limited to, a mouse interacts with the user interface to instruct it to show more information, which is then visually presented for the eyes. In an embodiment, this process may continue repeatedly for multiple iterations during an application session on a client device. For example, the touch interface of iPhone™ enables a user to slide a finger and scroll down a data list to read more records. A data list view might scroll slowly or rapidly based on slow or rapid touch screen events sent to a client application with each slide gesture. Embodiments of the invention efficiently handle display of data from large datasets on mobile devices having limited display sizes. For example, if there are tens of thousands of records in a dataset a mobile device may only be able to display a few rows at a time. A user can scroll through a data list view to read tens, possibly thousands of records, but still only a few are visible to the user at any one instant. A user can also scroll through a list slowly, rapidly, or not at all. A user may also browse only a few records instead of thousands of records in the data list view at that time. In an embodiment, all of the these scrolling and navigation scenarios are handled without subjecting the user to significant delays before the desired data can be viewed.

Embodiments of the invention additionally include a method that efficiently handles navigation and display of a large dataset within a UI of a mobile device by invoking functions in order to fetch subsets of the large dataset from a server. The method comprises storing, on the mobile device, primary keys for rows (i.e., data records) of the large dataset. In an embodiment, the large dataset is defined based upon a query or search initiated on the mobile device. For example, a search in a browser session on a mobile device can result in the definition of a large dataset, which is stored on a server. The method further comprises invoking a function to initialize a ListView. In an embodiment, the initialized ListView indicates the total number of records available in the dataset and the height (e.g., in pixels) of one visible row in the UI of the mobile device. The method fetches data for an active view area of the UI and binds the fetched data to UI elements on the mobile device. The fetched and bound data is then displayed as currently visible rows in the UI. To optimize UI response speed, the method fetches and binds data to UI elements for additional scroll behind and scroll ahead data pages that are adjacent to the currently visible rows. In this way, the method is able to quickly display data preceding and following data currently visible in the UI on the mobile device. In this way, a user's eye is sort of tricked into believing all the data was pre-loaded before the scrolling began.

The method further comprises defining a moving, logical data window on the mobile device. According to an embodiment, the moving window has a size Nx, where x is the number of records that can fit on a UI page on the mobile device and N represents the predicted scroll/navigation velocity in the UI. The method further comprises detecting scroll and navigation inputs, such as, but not limited to sliding gestures, and determines the velocity of the scrolling/navigation. Based on the velocity, the method dynamically adds pages to the moving data window. In an embodiment, the predicted scroll/navigation velocity is determined by user gestures within the UI and past and current scroll speeds. For example, in mobile devices having a touch screen user interfaces (UIs), the detected rapidness of a finger slide gesture results in a longer scroll. Predicted scroll/navigation velocity can also be determined by detecting the forcefulness of gestures. For example, detected forcefulness of slide gestures can be used to determine the predicted scroll/navigation velocity. Such forcefulness can be measured, for example, as a coefficient of friction for a touch screen slide gesture. Upon detecting that the scrolling/navigation has ended, the method fetches, binds, and displays rows the user has navigated to in the active view area of the UI on the mobile device.

Embodiments of the invention additionally include a computer-readable medium having computer-executable instructions stored thereon that, if executed by a computing device, cause the computing device to perform operations for efficiently fetching and displaying data from large datasets on a mobile device.

Embodiments of the invention include a system that handle the fetching and displaying of data from a large dataset on a mobile device. The system includes a UI on the mobile device to display data from large datasets from a remote database, wherein the displayed data is part of a ListView comprising visible rows and a logical data window resident on the mobile device. The system includes modules configured to fetch data rows from a server needed to populate visible rows and additional data pages for a logical data window within a ListView on the mobile device. In one embodiment of the invention, the modules are resident on the mobile device. In response to detecting navigation inputs or scrolling gestures within a UI on the mobile device, the system invokes a fetching module to fetch data rows from a server database corresponding to a query or list navigation input from a mobile device. The system binds the fetched data to UI elements on the mobile device. In an embodiment, the system comprises an initialization module on the mobile device configured to initialize a ListView data structure based on the total number of records in the dataset and the height of one visible (displayable) row in the UI on the mobile device. In one embodiment, the modules resident on the mobile device are written in a script language that can be read by mobile devices including, but not limited to, mobile devices running the iPhone™ operating system. In an exemplary non-limiting embodiment, the modules can be written in JavaScript.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the relevant art to make and use the invention.

Figure 1:
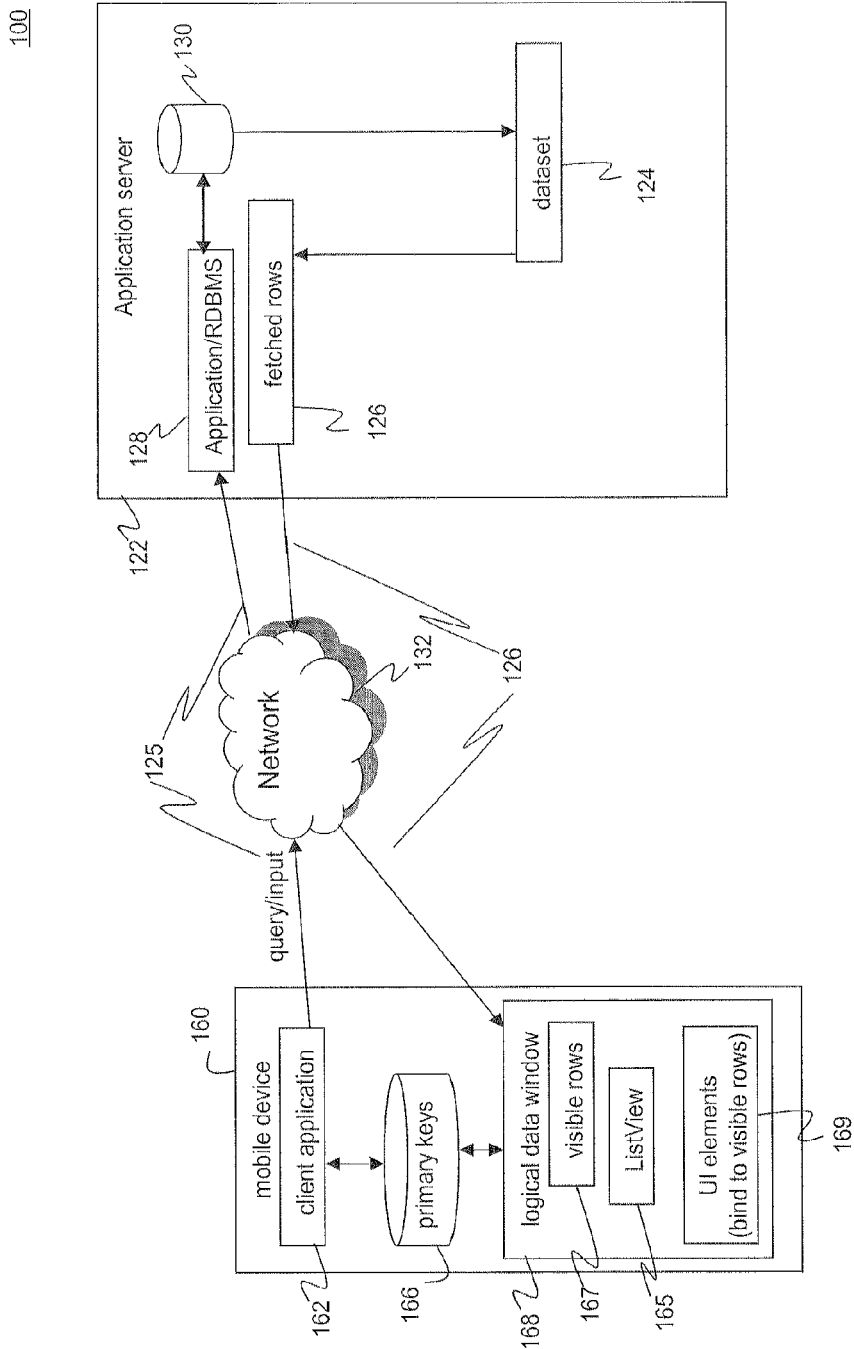
FIG. 1 is a diagram of an exemplary distributed system in which embodiments can be implemented.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

---

Table of Contents

I. Introduction
II. Data Fetching and ListView Displaying Systems
III. Example Mobile Device User Interface for Displaying a ListView
IV. Data Fetching and ListView Displaying Methods
V. Example Computer System Implementation
VI. Conclusion

---

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

The present invention relates to systems, methods, and computer program products for efficiently fetching and displaying data on mobile client devices wherein the data comprises a plurality of subsets of data selected from a large dataset residing on a remote server. Embodiments relate to graphically displaying and presenting a list view of a large dataset quickly on the limited content viewing area of a mobile device.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "display," "display screen," and "screen" are used interchangeably herein to refer broadly and inclusively to any type of display device or screen coupled to or integrated with a computing device for displaying content viewable by a user of the computing device. In an embodiment, the computing device is a mobile device. Such a display screen can include, for example and without limitation, a touch-screen liquid crystal display (LCD). In embodiments of the invention, a UI of a mobile device is viewed on a display. In an embodiment, the UI of the mobile device includes visible rows of a list view presented within and active view area in the mobile device's display.

Unless specifically stated differently, a user is interchangeably used herein to identify a human user, a software agent, or a group of users and/or software agents. Besides a human user who needs to fetch and view data, a software application or agent sometimes needs to fetch data to be displayed. Accordingly, unless specifically stated, the term "user" as used herein does not necessarily pertain to a human being.

The detailed description of embodiments of the present invention is divided into several sections. The first section describes systems for efficiently fetching data from large datasets on servers and displaying the fetched data on mobile client devices. Subsequent sections describe a user interface and methods for efficient fetching and displaying of data on mobile client devices.

II. Data Fetching and Listview Displaying Systems

FIG. 1 is an illustration of an exemplary distributed system 100 in which embodiments described herein can be implemented. Distributed system 100 includes an application server 122 hosting an application 128. In the exemplary embodiment depicted in FIG. 1, application 128 may be a relational database management system (RDBMS). In another embodiment, application 128 may be part of the SYBASE™ Unwired Platform (SUP). Although a single mobile device 160 is depicted in system 100, it is understood that a plurality of mobile devices 160 can access application server 122 and database 130 via wireless network 132.

Mobile device 160 can be any type of mobile computing device having one or more processors, an input device (for example, a touch-screen, QWERTY keyboard, microphone, a track pad, a scroll wheel, audio command, a track ball, or a T9 keyboard), and a communications infrastructure capable of receiving and transmitting data over a network. For example, mobile device 160 can include, but is not limited to, a personal digital assistant ("PDA"), an iPhone™, an iPod™, iTouch™ or iPad™ touch device, a device operating the Android operating system (OS) from Google Inc., a device operating according to the Microsoft Pocket PC specification with the Microsoft Windows® CE OS, a device running the Microsoft Windows® Mobile Standard OS, a device running the Microsoft Windows® Mobile Professional OS, a device running the Symbian OS, a device running the Palm OS®, a mobile phone, a BlackBerry® device, a smart phone, a hand held computer, a netbook computer, a palmtop computer, a laptop computer, an ultra-mobile PC, or another similar type of mobile device capable of processing instructions and receiving and transmitting data to and from humans and other computing devices.

Application server 122 can be any type of server or computing device capable of serving data from a database 130 to mobile device 160. For example, application server 122 can include, but is not limited to, a computer or a cluster of computers that may be a part of a server farm.

Network 132 can be any network or combination of networks that can carry data communication. Such network can include, but is not limited to, a wired (e.g., Ethernet) or a wireless (e.g., Wi-Fi, 3G, and 4G) network. In addition, network 132 can include, but is not limited to, a local area network, medium area network, and/or wide area network such as the Internet. Network 132 can support protocols and technology including, but not limited to, Internet or World Wide Web protocols and/or services. Intermediate network routers, gateways, or servers (not shown) may be provided between components of distributed system 100 depending upon a particular application or environment.

In an embodiment, application server 122 includes database 130. Database 130 may store any type of data, including, but not limited to, textual, image, audio, and video data to be used by application 128 and client application 162, hosted on application server 122 and mobile device 160, respectively. Although database 130 is shown as a component of application server 122, database 130 may be communicatively coupled to application server 122 via an indirect connection over a local, medium area, or wide area network. In addition, although only database 130 is shown, additional databases may be used as necessary.

Traditionally, server and enterprise applications, such as application 128 are installed as 'native' or platform-dependent applications on dedicated backend or enterprise servers such as application server 122. Despite the usefulness of these applications, it has been difficult to implement quick access to large amounts of data in database 130 and related dataset 124 from mobile devices 160. This problem is compounded when dataset 124 includes a large amount of data from database 130 that must be communicated via network 132. Even when dataset 124 comprises relatively low number of records from database 130, the size of the dataset can be large enough to encounter mobile retrieval and display delays when hybrid data is included (i.e., multimedia data). Without a responsive mobile UI for viewing fetched rows 126 from dataset 124, users of mobile devices 160 may find it preferable to access application 128 directly via application server 122 in order to be able to more quickly view fetched rows 126. For example, UI responses that take more than 150 milliseconds are likely to be perceived an unresponsive by users. Additionally, creating an interface to view data from database 130 and dataset 124 residing on application servers 122 has traditionally involved developing dedicated software for a mobile device platform, or including a native data browsing application as part of a mobile device platform or operating system (OS). However, these native mobile browsing applications are often unable to efficiently handle large datasets and datasets comprising hybrid data. Enabling efficient fetching of data from data set 124 on mobile device 160 increases the ease and speed with which fetched rows 126 can be viewed in a UI of mobile device 160. Another advantage of embodiments of the present invention is that mobile devices 160 lacking sufficient processing and storage resources to handle large data sets 124 can be used to view and navigate datasets 124 residing on application servers 122.

Figure 2:
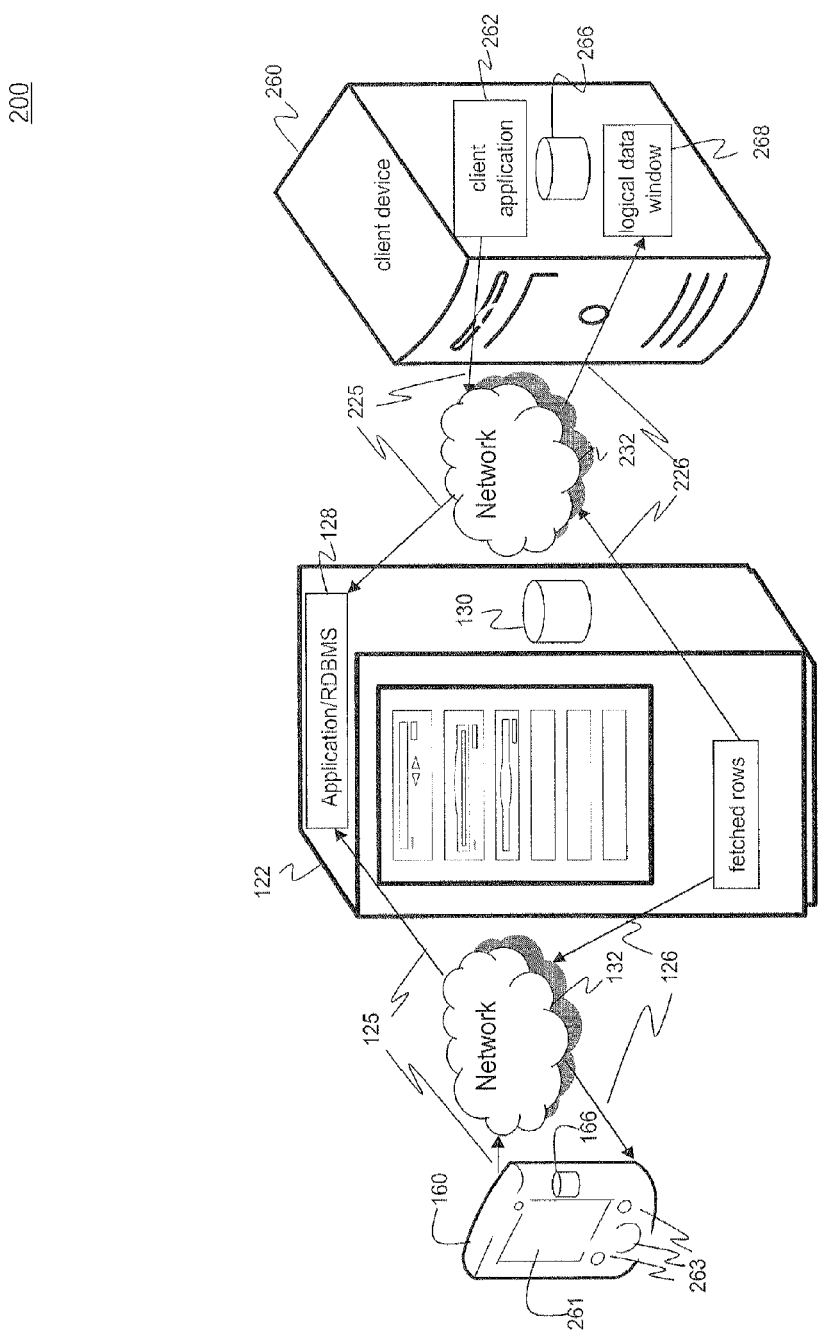
FIG. 2 illustrates a modular view of a system for handling large data sets on client devices, in accordance with an embodiment of the present invention.

In the exemplary data fetching and displaying systems 100 and 200 depicted in FIGS. 1 and 2, fetched rows 126 from database 130, which have been returned in response to a query/input 125, are received at mobile device 160. According to an embodiment of the invention, primary keys 166 corresponding to a dataset 124 are stored locally on the mobile device. In an embodiment, primary keys 166 of dataset 124 are stored in memory for fast access to the records database 130. The actual data records referred to by the primary keys 166 are stored in database 130 on application server 122. Dataset 124 is a subset of database 130 corresponding to primary keys 166 and a query/input 125 received from client application 162. Fetched rows 126 are received at mobile device 160, via network 132, when it needs to be bound to corresponding UI elements 169 within a logical data window 168 on mobile device 160. As shown in the example embodiment of FIG. 1, logical data window 168 comprises visible rows 167, a ListView 165, and UI elements 169. The components and functionality of logical data window 168 are described below in the context of the exemplary user interface depicted in FIGS. 3-7.

As used herein, in an embodiment, a ListView is logical data structure used to store data needed to graphically depict a list of data records from a dataset. A ListView has visible rows and rows that are not visible or do not have active focus within a UI. For example, designated visible rows in a ListView displays are rows to be displayed in a graphical user interface (GUI), wherein the visible rows are a subset of a larger dataset returned as a result of a search or query. The ListView maintains a dynamic, moving, logical data window of data pages of rows preceding and/or following the visible rows. In an embodiment, the data records from the dataset included in a ListView comprise hybrid data, such as, but not limited to, textual data combined with one or more of image data, audio data, and video data. As used herein, a ListView facilitates presentation of a navigable list of data records from a dataset having more records than can be simultaneously displayed within an active window of a GUI. That is, the data records in a ListView include both visible rows and records in a logical data window that extend beyond the current viewing area of GUI screen. According to an embodiment, the GUI screen is a screen of a mobile client device. In embodiments, a ListView enables navigation through a combination of user inputs, scroll commands, touch screen slide/scroll gestures so that rows of in the logical data window become part of the current viewing area of the GUI screen.

Data fetching and display systems 100 and 200 are operable to fetch fetched rows 126 and display visible rows 167 within logical data window 168 on mobile device 160. Client applications 162 and 262 detect slide gestures and measure the speed of the gestures. In an embodiment, the speed is measured in pixels per second (pps) relative to pixels of display 261 traversed in a second of scrolling. When client applications 162 and 262 know how fast a prior slide gesture was, they can determine how much and at what speed, in pps, a screen will scroll when a subsequent slide gesture of the same speed occurs. Client applications 162 and 262 also determine the height of a single visible row 167 in pixels. By determining this height, client applications 162 and 262 know how many visible rows 167 are scrolled over or navigated past for a given scroll speed (in pps).

Rows of ListView 165 farthest from visible rows 167 currently in focus on display 261 are reutilized dynamically to bind UI elements 169 to data within logical data window 168 that needs active focus.

According to an embodiment of the invention, client application 162 comprises modules configured to initialize ListView 165, define logical data window 168, and bind data for visible rows 167 to UI elements 169. The modules facilitate function calls to carry out the above-listed functionality. The following code is an embodiment of this functionality. In this example embodiment, JavaScript is used to implement the functions on mobile device 160. As would be appreciated by one of skill in the relevant arts, other programming languages and technologies can be used to implement the functionality listed in the programming language code sample below.

```
// initialize the ListView with the total number of records and
height on one visible row
init: function(heightOfRow, totalRecs) {
    heightOfVisibleRow = heightOfRow; // this may be in
pixels
    totalNumberOfRecords = totalRecs; // total number of
records available in a dataset, such as dataset 124
    recordsPerScreen               =
deviceResolutionY/heightOfVisibleRow;
}
touchStart: function(e) {
    // this is set when the touch starts
    isScrolling = true;
    finishedScrolling = false;
    distanceToScroll = 0;
    timeToCompleteScroll = 0;
    touchStartY = e.changedTouches[0].pageY;
    scrollingStartedAtY = currentScrollPositionY;
    scrollStartedTime = e.timeStamp;
},
touchMove: function(e) {
    var that = this,
        pageX = e.changedTouches[0].pageX,
        pageY = e.changedTouches[0].pageY,
        XDelta = pageX - touchStartX,
        YDelta = pageY - touchStartY,
        newX = currentX + XDelta,
        newY = currentY + YDelta;
        // -ve or +ve depending on the direction of scroll
        distance+= Math.abs(touchStartX - pageY);
        touchStartX = pageX;
        touchStartY = pageY;
        setPosition(newX, newY);
        doneMoving = true;
},
touchEnd: function(e) {
    var that = this,
        time = endTimeStamp - scrollStartedTime,
        velocityY, newPositionX, newPositionY;
        that.scrolling = false;
        velocityY = speedOfScroll(currentY - scrollStartY,
time);
        velocityX = speedOfScroll(currentX - scrollStartX,
time);
        newPositionX = currentX + velocityX.distance;
        newPositionY = currentY + velocityY.distance;
        scrollTo(newPositionX,         newPositionY,
velocityY.time + 'ms');
},
scrollSpeed: function(distance, time) {
    var frictionCoefficient = 2.0, // e.g., coefficient of friction
measured as a ratio of the force of friction between an input device
(finger, stylus, pointing device) and a touch screen display and the
force pressing them together
        deceleration = 1.1,
        velocity = distance / time * 1000,
        actualDistance    =    velocity    *    velocity    /
frictionCoefficient / 1000,
        actualTime = 0;
    // (this step makes sure we are headed in the direction of
scroll)
        actualDistance = actualDistance * (distance < 0 ? -1 : 1);
        actualDistance = velocity / deceleration;
        return { distance: actualDistance, time: actualTime };
},
```

As would be appreciated by one of skill in the relevant arts, some of the functions and variables listed in the code sample above may be optional and therefore not be populated for all varieties of mobile devices 160 and client devices 260. For example, in one embodiment of the present invention, mobile device 160 is a device running an iPhone™ operating system (OS) developed by Apple Inc. for the iPhone™ and iPod™ touch whose displays 261 are touch screen displays. However, in other embodiments of the invention, another type of mobile device 160 lacking a touch screen display may be used. Similarly, a personal computer client device 260 depicted in FIG. 2 may be used and may lack a touch screen display. Accordingly, the touchStart, touchMove, and touchEnd functions may be optional for certain mobile devices 160 and client devices 260.

In an embodiment, application 128 is configured to receive a query/input 125 from client application 162 via network 132. In embodiments, query/input 125 may comprise list navigation gestures and inputs in a UI displayed on display 261 depicted in FIG. 2. A user, using input device 263 of FIG. 2, can select one or more of searches, queries, or list navigation inputs on mobile device 160. These queries/inputs 125 are then forwarded to application server 122 via network 132.

Application 128 is further configured to identify a subset of data in database 130 comprising dataset 124. Dataset 124 corresponds to the received query/input 125. In an embodiment, application 128 interacts with database 130 to retrieve a plurality of fetched rows 126 from dataset 124 corresponding to query/input 125. The fetched rows 126 are received at mobile device 160 via network 132. At this point, fetched rows 126 populate a logical data window 168 on mobile device 160. Logical data window 168 is a virtual data window comprising visible rows 167, which are a subset of the fetched rows 126 displayed on display 261 of mobile device 160.

According to an embodiment, application server 122 may be one or more computers. For example, application server 122 may run on a cluster of computing devices operating in a cluster or server farm. In another embodiment, application server 122 may be a virtual machine running on a backend server (not shown).

As illustrated in FIG. 1, mobile device 160 may comprise a client application 162 and a local primary key data store 166. As depicted in FIG. 2, mobile device 160 may further comprise a display 261 and an input device 263. Input device 263 can be used by a user of mobile device 160 to initiate data searches (queries) and to navigate within a list view of data. Additionally, fetched rows 126 that have previously been received at mobile device 160, included in visible rows 167 of logical data window 168, and bound to UI elements 169 can be displayed on display 261.

Although database 130 is depicted in FIGS. 1 and 2 as being hosted locally on application server 122, it is understood that database 130 can be a remote database hosted on a separate database server (not shown) that is accessible by application server 122.

In accordance with an embodiment, data stored in database 130 hosted by application server 122 may also be synchronized with local data stores or databases 266 residing on one or more client devices 260. "Data" as used herein may be any object, including, but not limited to, information in any form (text, images, video, audio, etc.) displayable in display 261 of mobile device 160 or a display (not shown) of client device 260.

Systems 100 and 200 are commonly implemented within a persistent network connection over a cellular provider network, and communications of queries/input 125, fetched rows 126, and related communications may travel over the Internet. However, mobile device 160 may connect to application server 122 by any communication means by which application server 122, application server 122, and mobile device 160 may interact, such as a docking cradle, Wide Area Network (WAN), Local Area Network (LAN), Wireless Local Area Network (WLAN), infrared, or Bluetooth.

In a typical mobile environment, multiple mobile devices 160 send queries/input 125 to one or more application servers 122 via network 132.

FIG. 2 depicts data fetching and display system 200 in which mobile device 160 and client device 260 are capable of fetching data from application server 122 via networks 132 and 232, respectively. FIG. 2 is described with continued reference to the embodiment illustrated in FIG. 1. However, FIG. 2 is not limited to that example embodiment. As shown in FIG. 2, the data fetching and display system can also be implemented in mixed mobile and wired environments. For example, a logical data window 268 with features similar to logical data window 168 described above with reference to FIG. 1 and mobile device 160 can be implemented on a personal computer, such as client device 260. Application server 122 and client device 260 need not be a single physical computer, and may in fact comprise several computers distributed over a number of physical and network locations. For the purposes of illustration, mobile device 160, application server 122 and client device 260 are depicted as single points of access in data fetching and display systems 100 and 200. Application server 122 and client device 260 need not be separate physical computers either, and may in fact comprise a single computer as the functionality of client device 260 may be performed by a virtual machine running on application server 122. Conversely, the functionality of application server 122 may be performed by a virtual machine executing on client device 260.

In accordance with an embodiment of the present invention, application server 122 facilitates fetching of data from database 130 by processing queries/input 125 from mobile device 160 and queries/input 225 from client device 260. In the example embodiment depicted in FIG. 2, client device 260 is a personal computer hosting client application 262 and local primary key data store 266. Client application 262 may send queries/input 225 to application 128 via network 232. In response, application server 122 can return fetched rows 226 used to populate a virtual window 263 on client device 260. In this way, the system for data fetching and display described above with reference to FIG. 1 can be implemented for other types of client devices, in addition to the mobile device 160 embodiments described above. For example, client device 260 can be a workstation, terminal, server, or personal computer connected to application server 122 via network 232. Network 232 may be any one of the networks described above with reference to network 132. Network 232 can also be wired networks such as, but not limited to, wired LANs, WANs, Intranets, and Ethernet networks.

III. Example Mobile Device User Interface for Displaying a Listview

FIGS. 3-7 illustrate a graphical user interface (GUI), according to an embodiment of the present invention. The GUI depicted in FIGS. 3-7 is described with reference to the embodiments of FIGS. 1 and 2. However, the GUI is not limited to those example embodiments. FIGS. 3-7 illustrate an exemplary list view interface 300 displaying data rows from a logical data window 168 comprising ListView 165 and visible rows 167 with data bound to UI elements 169, according to an embodiment.

In an embodiment of the invention, the list view interface 300 illustrated in FIGS. 3-7 is displayed on mobile device 160 having display 261. For ease of explanation, the operation of list view interface 300 is discussed in the context of a mobile device platform with a touch-screen, but is not intended to be limited thereto. Examples of such mobile device platforms include, but are not limited to, the Windows Mobile from the Microsoft Corporation; the iPhone™ OS from Apple, Inc.; Android from Google Inc.; and Blackberry from Research In Motion ("RIM"). For example, mobile device 160 of FIGS. 1 and 2 may be used to implement the mobile device in this example.

Although in the exemplary embodiments depicted in FIGS. 3-7 the GUI is shown as an mobile device interface running in an iPhone™ OS, it is understood that the GUI can be readily adapted to execute on a display of other mobile device platforms and operating systems, a computer terminal, a display of client device 260, a display console of application server 122, or other display of a computing device.

Throughout FIGS. 3-7, displays are shown with various icons, command regions and buttons that are used to initiate action, invoke routines, launch displays, view data, scroll through data list views, or invoke other functionality. The initiated actions include, but are not limited to, a backward scroll, a forward scroll, and other list navigation inputs and gestures. For brevity, only the differences occurring within the figures, as compared to previous or subsequent ones of the figures, are described below.

Figure 3:
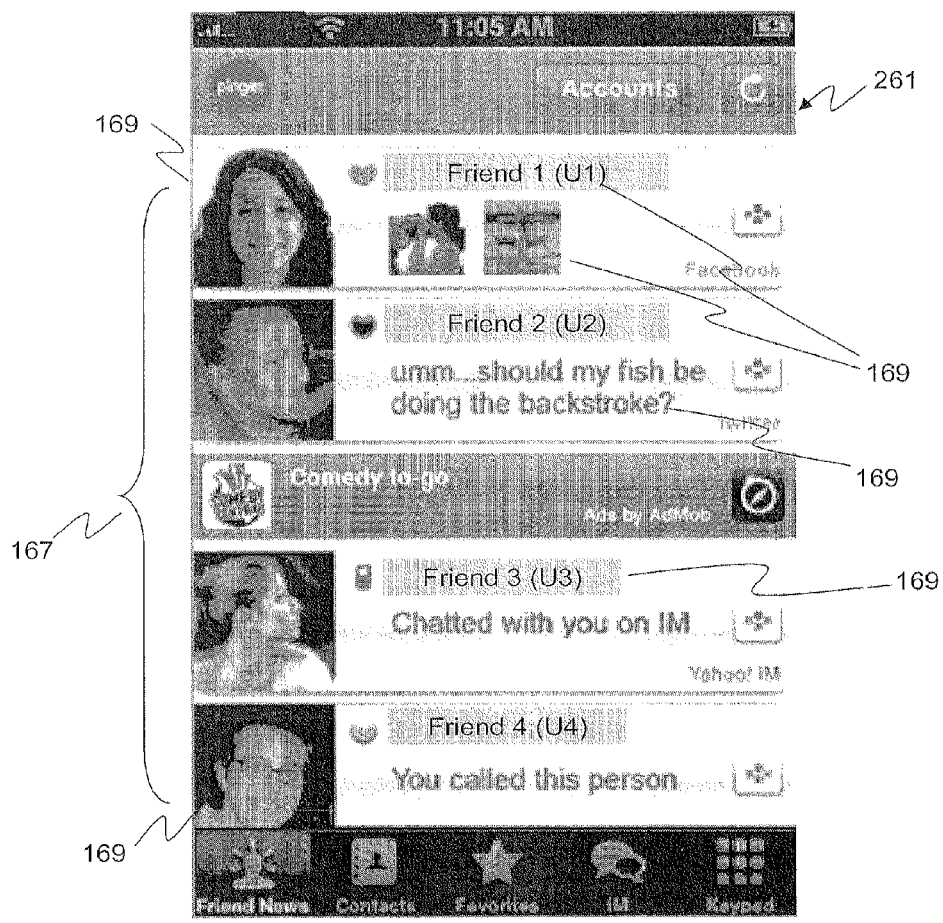
FIGS. 3-7 illustrate an exemplary graphical user interface (GUI), wherein large datasets can be fetched and displayed on a mobile device, in accordance with an embodiment of the invention.

FIG. 3 illustrates an exemplary list view interface 300 for showing an account list wherein pluralities of UI elements 169 can be displayed in display 261 in order to enable the user to view fetched rows 126, in accordance with an embodiment of the invention. As shown in FIG. 3, at times there are image/icon UI elements 169 that need to be bound to visible rows 167 shown in display 261.

Figure 4:
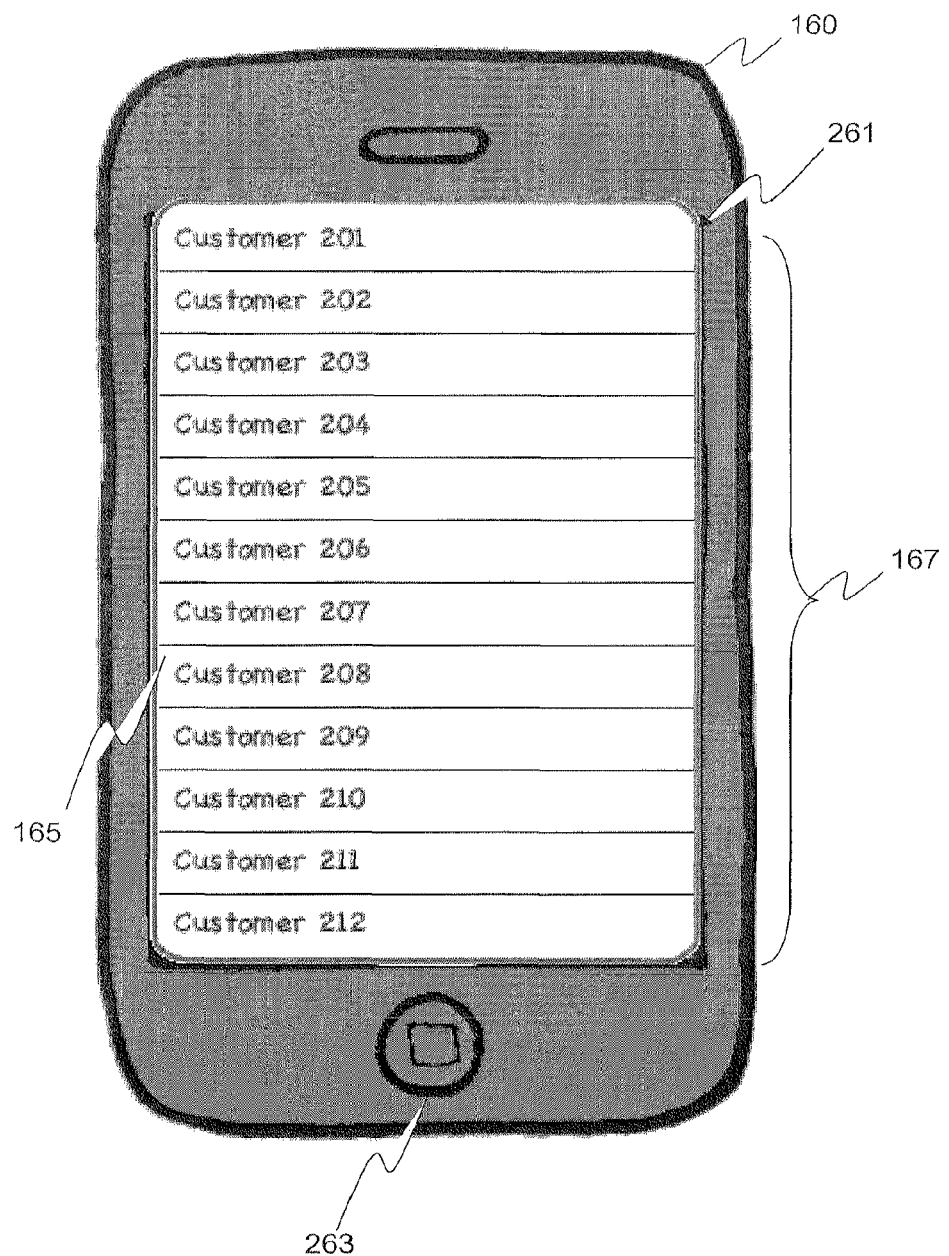

In an embodiment, a system for data fetching and displaying includes list view interface 300 and also includes an input device, such as input device 263 shown in FIG. 4, which is configured to allow a user to scroll and navigate to other portions of a dataset 124 besides visible rows 167 currently being displayed. For example, through moving a pointer or cursor in list view interface 300, a user can scroll to view additional rows within a logical data window 168. In an embodiment, the display may be a computer display 930 shown in FIG. 9, and list view interface 300 may be display interface 902. According to embodiments of the present invention, input device 263 can be, but is not limited to, for example, a touch screen, a pointing device, a track ball, a touch pad, a mouse, a keyboard, a keypad, a joy stick, a voice activated control system, or other input devices used to provide interaction between a user and list view interface 300.

In the example shown in FIG. 3, display 261 is only able to display four fetched rows 126 (e.g., U1-U4) as visible rows 167 in list view interface 300 at any instant. Each visible row 167 has a set height, in pixels, within list view interface 300. However, a user may wish to scroll ahead to (potentially) many more pages of data beyond the four rows currently displayed in list view interface 300. This presents a challenge when dealing with large, hybrid datasets, such as the data shown in FIG. 3 (comprising text, icons, and graphics).

If there are tens of thousands of records in dataset 124 corresponding to visible row 167, display 261 can still only present four records at a time. However, a user, using an input device, can scroll through list view interface 300 and read tens, and possibly thousands of records, while still only being able to view four visible rows 167 at any one instant. The number of visible rows 167 varies based on the form factor of the mobile device 160 in question or the design of the UI rows (i.e., the height, in pixels of the UI rows and UI elements 169). A user, using an input device, may scroll through a list view interface 300 slowly, rapidly, or not at all. By using list view interface 300, a user can quickly browse a few visible rows 167 without the entire underlying dataset 124 being stored locally on mobile device 160. For example, in an embodiment, list view interface 300 can be used in conjunction with the components of systems 100 and 200 described above to view visible rows 167 within 150 milliseconds after a user selects an active view.

In one embodiment of the invention, preference is given to fetching data, over other tasks such as displaying/rendering visible rows 167, when the detected or predicted speed of scroll is zero or approaching zero. This is because a UI, such as the browser interface for list view interface 300, may have only one thread and JavaScript and UI rendering will need to be handled in that one thread. This means that if the windows depicted in FIGS. 3-7 are scrolling and there is an attempt to fetch data there will be a slight, yet noticeable flicker in the display unless preference is given to fetching data as the scroll speed approaches 0. Since there is no guarantee that a detected scroll speed will approach or be zero (given that this embodiment is also trying to handle rapid scroll gestures), this particular embodiment is not applicable in all scrolling/UI scenarios.

With continued reference to FIG. 3, display 261 displays the first four records (U1-U4) of a dataset 124 and as the user scrolls one page a 'scroll ahead' page from logical data window 168 is quickly fetched so that the next four records are displayed. This repeats for every slide gesture down the list so that visible rows 167 change as the user scrolls within list view interface 300. As discussed above with reference to FIG. 1, scroll ahead data pages are quickly displayable by dynamically loading records from a ListView 165, adding them to logical data window 168, and binding them to UI elements 169 before they are actually displayed in display 261. If a user slides to the bottom of the list through continuous slide-down gestures within list view interface 300, client application 162 avoids delays and inefficiencies associated with fetching and populating a data list view four records at a time. Instead, the example embodiment of FIG. 3 employs a ListView 165 having only four horizontal UI rows, wherein a UI row is an actual UI element 169 that displays a corresponding data record from fetched rows 126 and data is bound to the UI elements 169 dynamically based on the scroll position of the data list view. This embodiment is acceptable if the scrolling speed is slow enough and the data swapping rate is sufficiently fast for the user to not notice any UI responsiveness lag within list view interface 300. In scenarios where the user may use the touch interface rapidly and the data for a certain page might not be there and could slow down the UI.

For cases where rapid scrolling is performed, an embodiment of the invention designs logic for ListView 165 as follows. ListView 165 starts with a logical data window 168 that has three times the UI rows that can be displayed on a single viewable page (4 in the example of FIG. 3). In this way the moving, logical data window 168 will completely fit the UI window of list view interface 300 at all times.

An example of a logical data window 168 is provided below in Table 1. In Table 1, R1-R10000 represent data records of a dataset 124 comprising 1000 records and U6-U17 represent user interface records within logical data window 168.

TABLE 1

| Logical Data Window |
| --- |
| R1 R2 R3 R4 R5 R6 R7 R8 R9 R10 R11 R12 R13 R14 R15 R16 R17 R18 |
| R19 R20 . . . R1000 |
| U6 U7 U8 U9 U10 U11 U12 U13 U14 U15 U16 U17 |

In the example provided in Table 1, initially, only records R6 through R17 will be read into ListView 165 (i.e., as rows U6-U17). In an embodiment, the currently displaying page with visible rows 167 is always "roughly" in the middle of logical data window 168, which is U12.

As shown in Table 1, a virtual, logical data window comprising R6-R17 is maintained that remains in sync with ListView 165 comprising U6-U17. As user scrolls, another page the data window changes to R7-R17 and so on. If instead user scrolled up one page the virtual data window would now be R5-R16.

One issue with defining the logical data window 168 in this way is that if the user scrolls rapidly, the ListView 165 may scroll tens of pages a second. When query/input 125 involves rapid scrolling or fast slide gestures, there may be delays for the data fetch needed to return fetched rows 126. Similarly, rapid scrolling and fast slide gestures within list view interface 300 can result in delays displaying corresponding updates to visible rows 167 as the display 261 struggles to keep up. In order to handle this scenario, an embodiment of the invention sets the size of the logical data window 168 and the UI window dynamically. The size is determined by calculating the speed of the scroll in either direction. In one embodiment, the speed of scroll is defined as the number of pages a user is scrolling per second. For example, the scroll speed or velocity may change over time, thus causing the size of logical data window to expand (in cases of faster scrolling) or contract (in cases of slower scrolling). Thus, logical data window will grow to include additional data pages as faster scrolling is detected and will shrink to include fewer data pages as scrolling slows down.

FIG. 4 depicts a ListView 165 with finite number of records. In the example of FIG. 4, ListView 165 has visible rows 167 comprising Customer records 201-212 and rows within logical data window 168 that are not visible or do not have active focus within display 261 (e.g., rows displaying Customer records 1-200 and 213-1000).

An embodiment of the invention optimizes ListView 165 under the premise that a display 261 can present only a finite number of records at a time. In an embodiment, upon detecting that a user gestures or scrolls to view more data, UI latency is avoided or minimized by dynamically reutilizing the portion of ListView 165 that does not have active visual focus within display 261.

Figure 5:
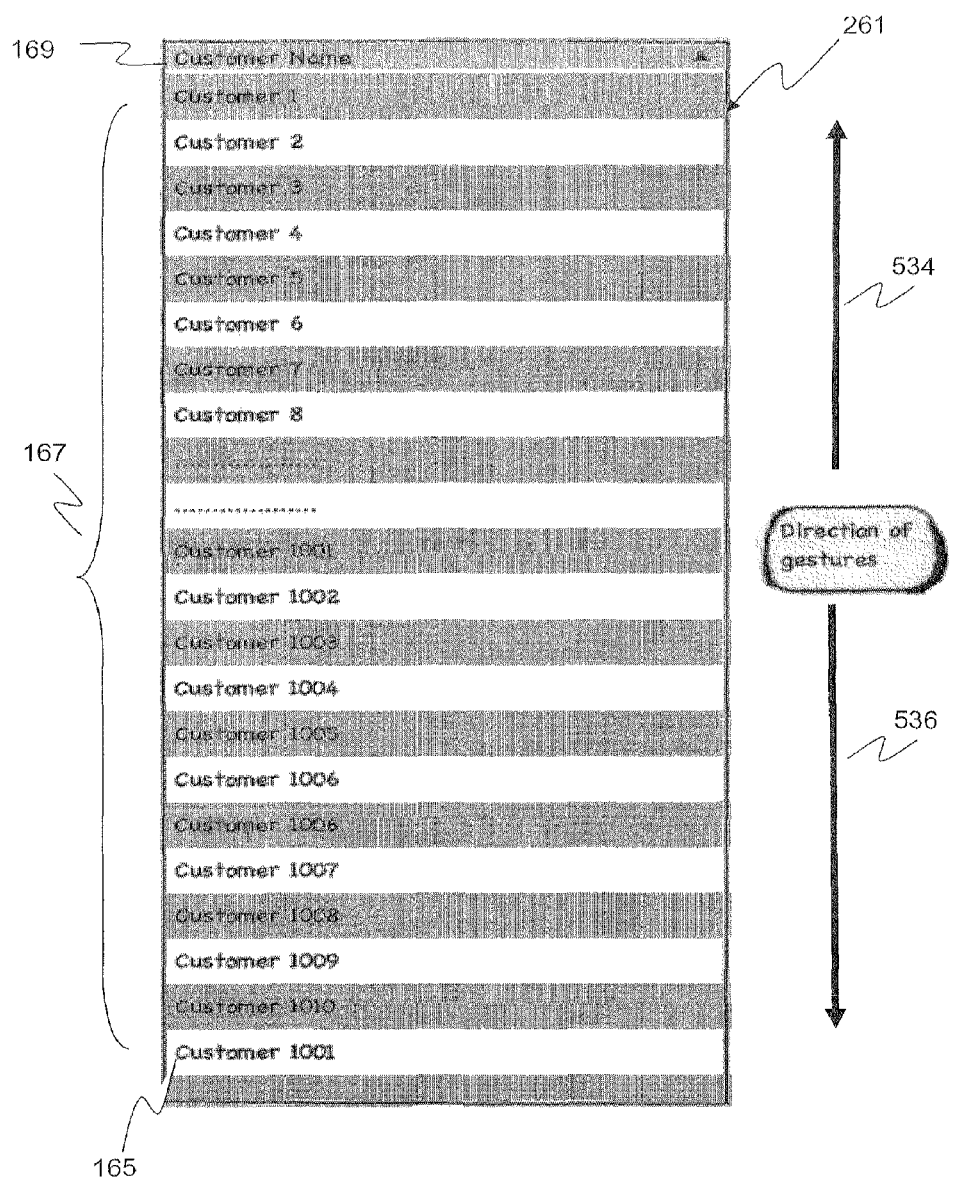

FIG. 5 shows actual data (e.g., visible rows 167 with Customer records 1-1001) bound to ListView 165 before optimization. ListView 165 holds data bound to a UI element 169 for each UI row within display 261. Direction of the slide gestures indicate which way ListView 165 will scroll. In the example shown in FIG. 5 scroll up 534 and scroll down 536 gestures can be detected along a Y-axis. As would be understood by those skilled in the relevant art(s), the scrolling could be along the X-axis for a ListView 165 that is oriented or laid out horizontally.

Figure 6:
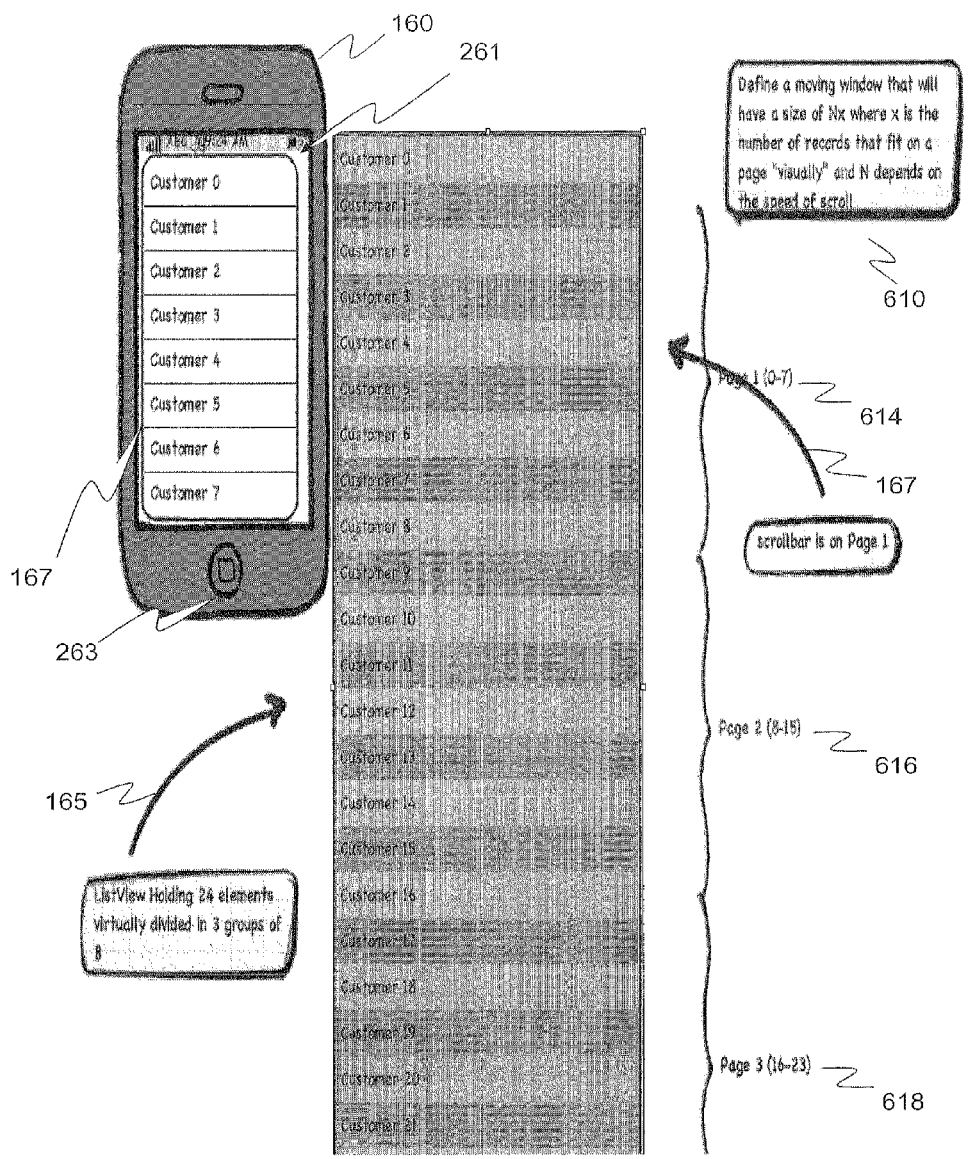
Figure 7:
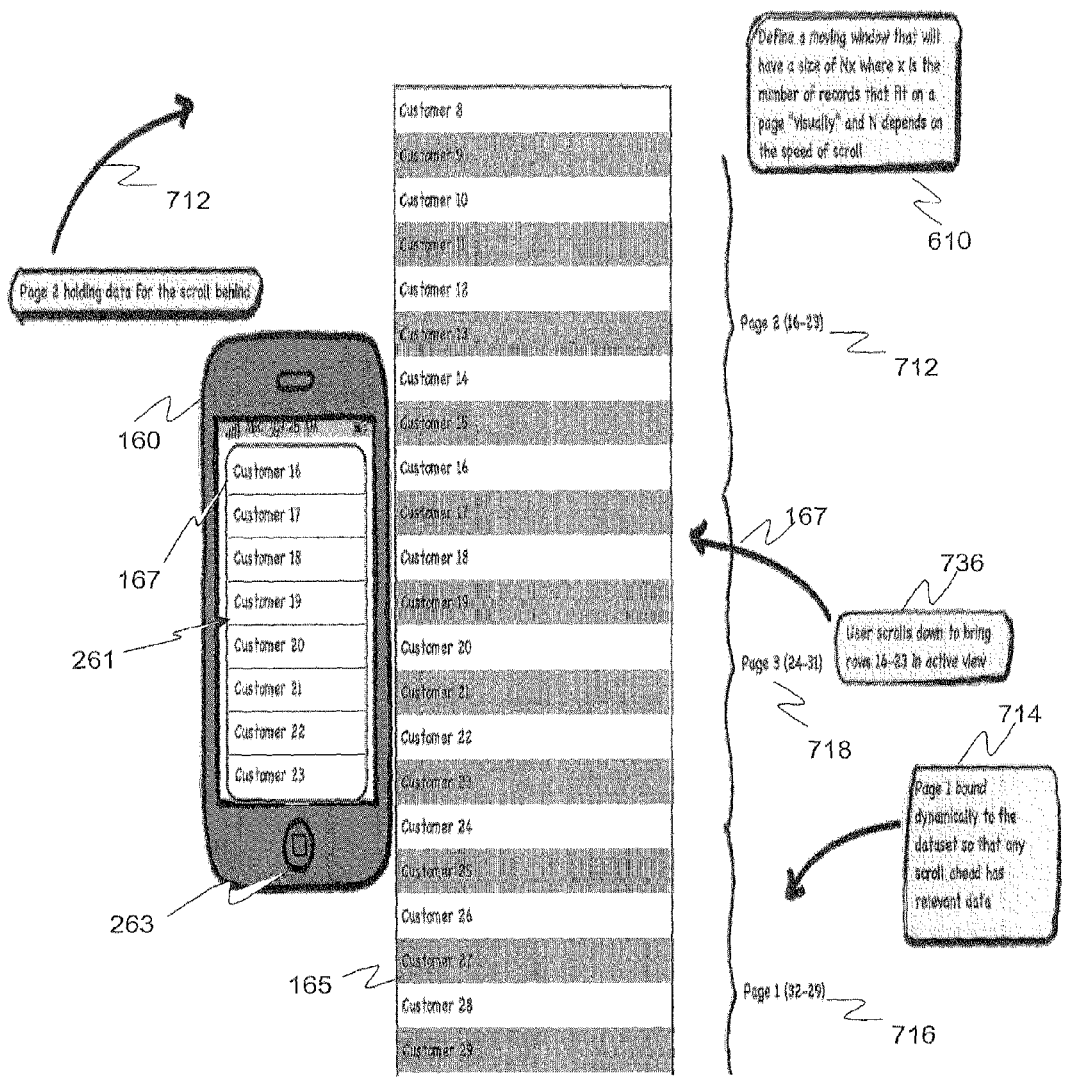

FIGS. 6 and 7 depict the optimization of ListView 165 based upon scrolling gestures. FIGS. 6 and 7 is described with continued reference to the embodiments illustrated in FIGS. 1-5. However, FIGS. 6 and 7 are not limited to those embodiments.

The ListView optimization begins by defining a moving window. In the embodiment shown in FIG. 6, the moving window is defined 610 to have a size Nx where x is the number of records that fit on a page visually and N depends on the speed of scroll. For example, x would be four based on the exemplary list view interface 300 illustrated in FIG. 3 and N would be measured in pixels per second (pps) of scroll up 534 or scroll down 536 gestures. When a scroll bar, cursor, or other pointer is on page 1, visible rows 167 are in focus and displayed within display 261 of mobile device 160. At this point, ListView 165 contains 24 records (i.e., R0-23) divided into 3 groups or data pages, 614, 616, and 618 having eight records each. In the example shown in FIG. 6, data pages 616 and 618 are 'scroll ahead' pages that are pre-loaded in case a scroll down 536 gesture is detected. No 'scroll behind' pages are defined at this point as the scroll bar is on the first page, page 614 and R0 is the first record in ListView 165.

FIG. 7 depicts changes to ListView 165 and visible rows 167 after a scroll down 536 gesture has occurred and data rows 16-23 are in the new active view 736. At this point, the moving window is again defined 610 and is resized to have a size of Nx where N depends on the speed of the scroll down 536 gesture. At this point data page 712 is defined as scroll behind page 712. In the example shown in FIG. 7, scroll behind page 712 will hold customer records 8-15 so that the scroll behind data can be quickly displayed in the event a scroll up 534 gesture is detected. After the active view 736 is set with rows 16-23, the first data page is dynamically bound 714 so that the scroll ahead page 716 has relevant data. In the example shown in FIG. 7, scroll ahead page 716 has records 32-39 so that those records can be quickly displayed in response to detecting a scroll down 536 operation. The ListView optimization, including defining 610 and dynamic page binding 714 is repeated iteratively as additional scroll up 534 and/or scroll down 536 gestures are detected. In this way, scroll behind pages 712 and scroll ahead pages 716 are dynamically bound so that visible rows 167 can be displayed in display 261 quickly as a user scrolls through ListView 165.

IV. Data Fetching and Listview Displaying Methods

Figure 8:
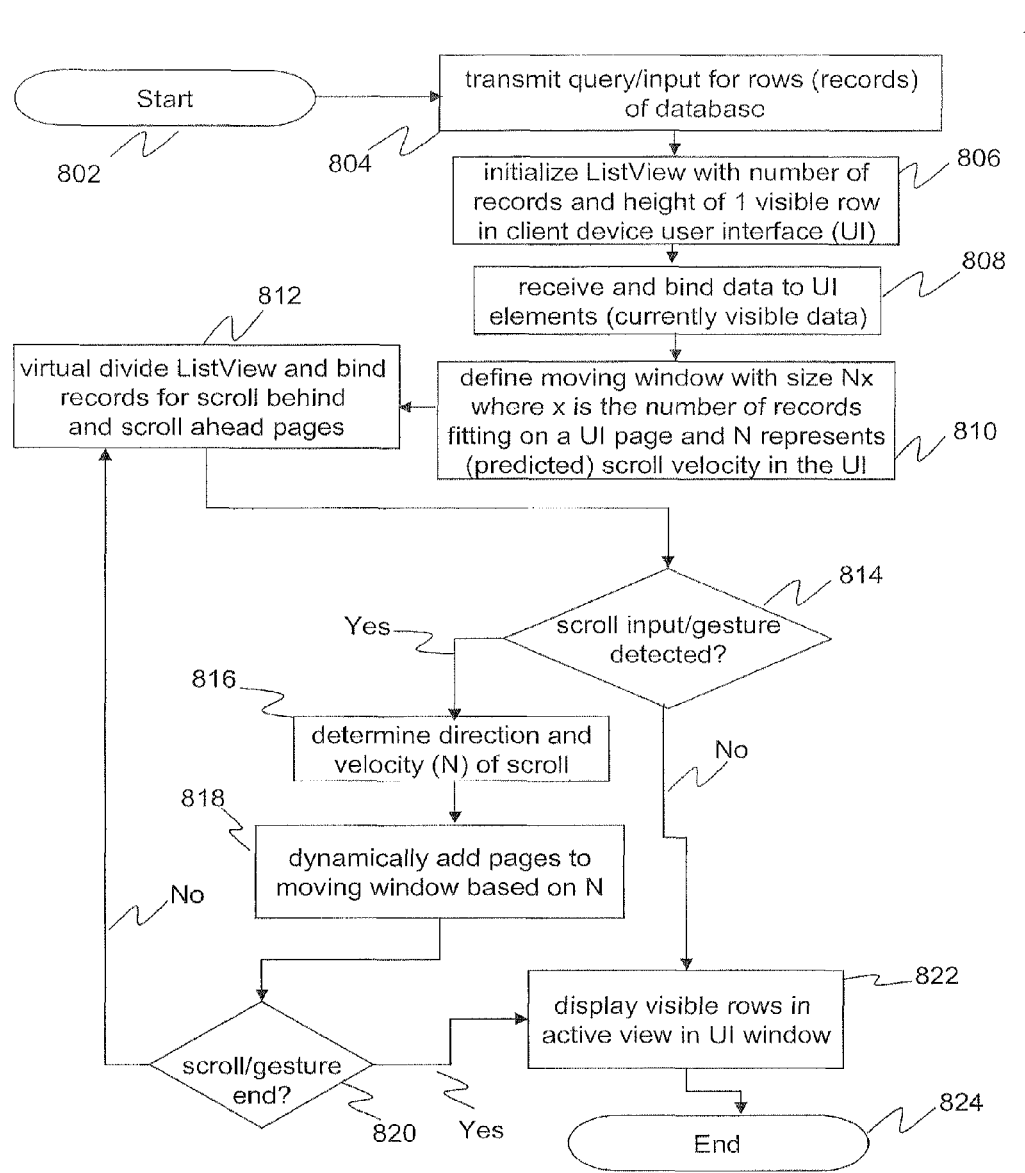
FIG. 8 is a flowchart illustrating steps by which large datasets can be fetched and displayed on a mobile device, in accordance with an embodiment of the present invention.

FIG. 8 is a flowchart 800 illustrating steps by which records are fetched from a large dataset and displayed on a mobile device, in accordance with an embodiment of the present invention.

More particularly, flowchart 800 illustrates the steps by which a dataset from a database on an application server are quickly displayed on a mobile client device, according to an embodiment of the present invention. FIG. 8 is described with continued reference to the embodiments illustrated in FIGS. 1-7. However, FIG. 8 is not limited to those embodiments. Note that the steps in the flowchart do not necessarily have to occur in the order shown.

The method begins at step 802 and proceeds to step 804 where a query or input for rows of a database are detected on mobile device 160 and transmitted. Query or input 125 may be sent from mobile device 160 to an application server 122 in this step. Query/input 125 may be an initial search or query. Query/input can also be a navigation within an existing data list view. After transmitting the query/input, the method proceeds to step 806.

In step 806, a ListView 165 is initialized with the number of records of a list view interface and a height of 1 visible row. This ListView initialization occurs in the UI of a client device, such as mobile device 160. Once the ListView is initialized, the method proceeds to step 808.

In step 808, data corresponding to the query/input transmitted in step 804 is received and bound to UI elements 169. In an embodiment of the invention, primary keys 166 for the received data are stored in memory of mobile device 160 so that subsequent steps can be performed quickly. According to an embodiment, fetched rows 126 are received in step 808 wherein fetched rows 126 are a subset of a large dataset 124 within a database 130 hosted on application server 122. After the data is received and bound to UI elements, the method proceeds to step 810.

In step 810, a moving window is defined. In an embodiment, the moving window defined in this step has size Nx, where x is the number of records fitting on a UI page on the receiving client device and N represents a (predicted) scroll speed in the UI. For example, the scroll speed may be predicted based upon prior scroll up 534 or scroll down 536 gestures. In an embodiment, this step creates a logical data window 168 comprising visible rows 167. After the moving window is defined, control is passed to step 812.

In step 812, the ListView is virtually divided and records within the moving window defined in step 810 are dynamically bound to data pages for scroll ahead and scroll behind pages. In an embodiment, if the focus in the UI is on the first data page within the moving window, no data is bound for a scroll behind page. Similarly, if the visible rows 167 are for the last page, no data is bound for a scroll ahead page. After the ListView is divided and data is bound for the scroll ahead and scroll behind pages, control is passed to step 814.

In step 814, an evaluation is made regarding whether a scroll input or gesture is detected. If it is determined that a scroll input/gesture is detected, control is passed to step 816. If it is determined no scroll input/gesture has occurred, then control is passed to step 822.

In step 816, in an embodiment the direction and velocity of the detected scroll is determined. In an embodiment, the scroll direction can be up or down for list views displayed along a Y-axis (i.e., vertical lists). Alternatively, the scroll direction can be on of left or right for list views displayed along an X-axis (i.e., horizontal lists). In this step, in an embodiment, the velocity or speed of the scroll is measure in pixels per second (pps) as the scrolling occurs within a UI. After the scroll direction and velocity is determined, control is passed to step 818.

In step 818, data pages are dynamically added to the moving window defined in step 810 based on the scroll speed N and direction determined in step 816. After dynamically adding data pages to the moving window, control is passed to step 820.

In step 820, an evaluation is made regarding whether the scrolling input/gesture has ended. If it is determined that the scrolling input/gesture has ended, control is passed to step 822. If it is determined that scrolling input/gesture is ongoing, then control is passed to back to step 812 where the ListView is virtually divided and records are bound for scroll behind/ahead pages.

In step 822, rows of data corresponding to an active view of the UI are displayed. In an embodiment, this step is performed by displaying visible rows 167 corresponding to the rows of ListView 165 that are in focus when the scrolling ended. After the visible rows are displayed, control is passed to step 824 where the method ends.

V. Example Computer System Implementation

Figure 9:
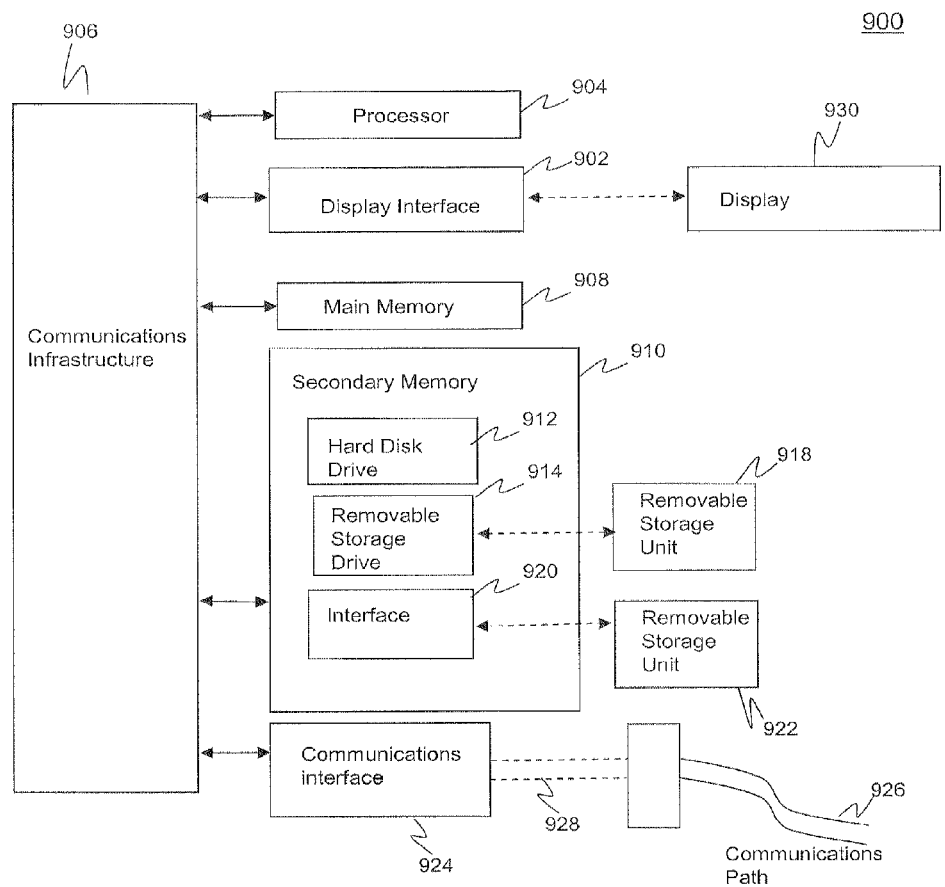
FIG. 9 depicts an example computer system in which the present invention may be implemented.

FIG. 9 illustrates an example computer system 900 in which embodiments of the present invention, or portions thereof, may be implemented as computer-readable code. For example, data fetching systems 100 and 200 of FIGS. 1 and 2 can be implemented in computer system 900 using hardware, software, firmware, non-transitory computer readable media having instructions stored thereon, or a combination thereof and may be implemented in one or more computer systems or other processing systems. Hardware, software, or any combination of such may embody any of the modules and components used to implement the user interface of FIGS. 3-7.

For example, the methods illustrated by the flowchart 800 of FIG. 8 can be implemented in system 900. Various embodiments of the invention are described in terms of this example computer system 900. After reading this description, it will become apparent to a person skilled in the relevant art how to implement the invention using other computer systems and/or computer architectures.

Computer system 900 includes one or more processors, such as processor 904. Processor 904 can be a special purpose or a general purpose processor. Processor 904 is connected to a communication infrastructure 906 (for example, a bus, or network).

Computer system 900 also includes a main memory 908, preferably random access memory (RAM), and may also include a secondary memory 910. Secondary memory 910 may include, for example, a hard disk drive 912, a removable storage drive 914, flash memory, a memory stick, and/or any similar non-volatile storage mechanism. Removable storage drive 914 may comprise a floppy disk drive, a magnetic tape drive, an optical disk drive, a flash memory, or the like. The removable storage drive 914 reads from and/or writes to a removable storage unit 918 in a well known manner. Removable storage unit 918 may comprise a floppy disk, magnetic tape, optical disk, etc. which is read by and written to by removable storage drive 914. As will be appreciated by persons skilled in the relevant art, removable storage unit 918 includes a non-transitory computer usable storage medium having stored therein computer software and/or data.

In alternative implementations, secondary memory 910 may include other similar means for allowing computer programs or other instructions to be loaded into computer system 900. Such means may include, for example, a removable storage unit 922 and an interface 920. Examples of such means may include a program cartridge and cartridge interface (such as that found in video game devices), a removable memory chip (such as an EPROM, or PROM) and associated socket, and other removable storage units 922 and interfaces 920 which allow software and data to be transferred from the removable storage unit 922 to computer system 900.

Computer system 900 may also include a communications interface 924. Communications interface 924 allows software and data to be transferred between computer system 900 and external devices. Communications interface 924 may include a modem, a network interface (such as an Ethernet card), a communications port, a PCMCIA slot and card, or the like. Software and data transferred via communications interface 924 are in the form of signals, which may be electronic, electromagnetic, optical, or other signals capable of being received by communications interface 924. These signals are provided to communications interface 924 via a communications path 926. Communications path 926 carries signals and may be implemented using wire or cable, fiber optics, a phone line, a cellular phone link, an RF link or other communications channels.

In this document, the terms "computer program medium," "non-transitory computer readable medium," and "computer usable medium" are used to generally refer to media such as removable storage unit 918, removable storage unit 922, and a hard disk installed in hard disk drive 912. Signals carried over communications path 926 can also embody the logic described herein. Computer program medium and computer usable medium can also refer to memories, such as main memory 908 and secondary memory 910, which can be memory semiconductors (e.g. DRAMs, etc.). These computer program products are means for providing software to computer system 900.

Computer programs (also called computer control logic) are stored in main memory 908 and/or secondary memory 910. Computer programs may also be received via communications interface 924. Such computer programs, when executed, enable computer system 900 to implement the present invention as discussed herein. In particular, the computer programs, when executed, enable processor 904 to implement the processes of the present invention, such as the steps in the methods illustrated by flowchart 800 of FIG. 8 discussed above. Accordingly, such computer programs represent controllers of the computer system 900. Where the invention is implemented using software, the software may be stored in a computer program product and loaded into computer system 900 using removable storage drive 914, interface 920, hard drive 912, or communications interface 924.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A computer-implemented method for displaying a list view of a dataset on a mobile device, comprising:
   initializing a list view for the mobile device, wherein the list view comprises bound primary keys and bound data rows received from a server and bound to user interface (UI) elements as displayed on the mobile device;
   receiving data from the server in response to a query, wherein the received data comprises a plurality of primary keys corresponding to data rows from the dataset not already received at the mobile device, and wherein the corresponding data rows are stored on the server;
   in response to detecting a direction and velocity of a scrolling input within the UI of the mobile device, defining a logical data window to have a size Nx, wherein x is a number of records simultaneously displayable on a page of the UI, and wherein N is a scroll speed, the logical window comprising the received primary key data which is not displayed on the mobile device;
   predicting the scroll speed of the scrolling input based on a previous scrolling speed;
   based on the speed of the scrolling input predicted to be a predetermined value, allocating a thread to fetch data;
   based on the speed of the scrolling input predicted to be other than the predetermined value, receiving the data rows of the data set corresponding to the primary keys already received at the mobile device that comprise the logical data window;
   binding, at the mobile device, the requested data rows corresponding to the primary keys of the logical data window, to a plurality of UI elements for display on the mobile device within the logical data window and prior to display in the list view, wherein the logical data window comprises a plurality of virtual groups bound to UI elements and sized based on a size of the logical data window and the direction and velocity of the scrolling input.

2. The method of claim 1, further comprising dividing the list view into virtual groups.

3. The method of claim 2, virtual groups comprise records for scroll behind data pages and scroll ahead data pages.

4. The method of claim 1, wherein the list view is a logical data structure based on a number of records displayable in the UI and a height of one visible row in the UI.

5. The method of claim 1, wherein the scroll speed is measured in pixels per second.

6. The method of claim 1, wherein the UI of the mobile device comprises a touch screen display, and wherein the scroll speed is predicted based upon a forcefulness measure of a scrolling gesture.

7. The method of claim 6, wherein the forcefulness measure of a scrolling gesture is based in part on the coefficient of friction on a touch screen UI of the mobile device.

8. The method of claim 1, wherein the dataset comprises hybrid data.

9. The method of claim 8, wherein the hybrid data comprises multimedia data types.

10. The method of claim 1, further comprising:
    detecting a second direction and a second velocity of a scrolling input within the UI of the mobile device; and
    redefining a size of the logical data window based on the second direction and second velocity, wherein the size of the logical data window prior to the redefining is different from the size of the logical data window after the redefining.

11. The method of claim 1, wherein based on the predicted speed of the scrolling input predicted to be the predetermined value, the allocating further comprises:
    predicting the speed of the scrolling input to be zero;
    determining that the thread is allocated to render visible rows.

12. The method of claim 1, further comprising:
    resizing a moving window based on the scrolling speed, wherein the moving window indicates a number of records displayed on a screen; and
    dynamically binding the size of the moving window.

13. A non-transitory computer-readable medium having stored thereon, computer-executable instructions that, in response to execution by a computing device, cause the computing device to perform operations for displaying data on a mobile device, the operations comprising:
    initializing a list view for the mobile device, wherein the list view comprises bound primary keys and bound data rows received from a server and bound to user interface (UI) elements as displayed on the mobile device;
    receiving data from the server in response to a query, wherein the received data comprises a plurality of primary keys corresponding to data rows from the dataset not already received at the mobile device, and wherein the corresponding data rows are stored on the server;
    in response to detecting a direction and velocity of a scrolling input within the UI of the mobile device, defining a logical data window to have a size Nx, wherein x is a number of records simultaneously displayable on a page of the UI, and wherein N is a scroll speed, the logical window comprising the received primary key data which is not displayed on the mobile device;
    predicting the scroll speed of the scrolling input based on a previous scrolling speed;
    based on the speed of the scrolling input predicted to be a predetermined value, allocating a thread to fetch data;
    based on the speed of the scrolling input predicated to be other than the predetermined value, receiving the data rows of the data set corresponding to the primary keys already received at the mobile device that comprise the logical data window;
    binding, at the mobile device, the requested data rows corresponding to the primary keys of the logical data window, to a plurality of UI elements for display on the mobile device within the logical data window and prior to display in the list view, wherein the logical data window comprises a plurality of virtual groups bound to UI elements and sized based on a size of the logical data window and the direction and velocity of the scrolling input.

14. A system capable of displaying a list view of a dataset, the system comprising:
  a mobile device comprising:
    a fetching module configured to retrieve primary keys from the dataset in response to a query, wherein the primary keys correspond to data rows from the dataset not already received at the mobile device, and wherein the corresponding data rows are stored on a server;
    an initialization module configured to initialize a list view data structure based on a number of records in the dataset and a height of one row in the UI of the mobile device;
    a definition module configured to, in response to detecting a direction and velocity of a scrolling input within the UI of the mobile device, define a logical data window to have a size Nx, wherein x is a number of records simultaneously displayable on a page of the UI, and wherein N is a scroll speed, the logical window comprising the received primary key data which is not displayed on the mobile device;
    a dynamic paging module, configured to:
    predict the scroll speed of the scrolling input based on a previous scrolling speed;
    based on the speed of the scrolling input predicted to be a predetermined value, allocate a thread to fetch data;
    based on the speed of the scrolling input predicted to be other than the predetermined value, receive the data rows of the data set corresponding to the primary keys already received at the mobile device that comprise the logical data window;
    a binding module configured to bind the requested data rows corresponding to the primary keys of the logical data window, to a plurality of UI elements for display on the mobile device within the logical data window and prior to display in the list view, wherein the logical data window comprises a plurality of virtual groups bound to UI elements and sized based on a size of the logical data window and the direction and velocity of the scrolling input; and
    a display module configured to display the requested data rows corresponding to the primary keys of the logical data window bound to the plurality of UI elements.

15. The system of claim 14, wherein the primary keys are stored in a memory of the mobile device.

16. The system of claim 15, wherein the display module is further configured to display the portion of the plurality of data rows within 150 milliseconds after the receiving module receives the selection of an active view.

17. A computer program product comprising a non-transitory computer usable medium having computer program logic recorded thereon for enabling a processor to display a list view of a dataset at a client device, the computer program logic comprising:
  fetching means for enabling the processor to retrieve primary keys from the dataset in response to a query, wherein the primary keys correspond to data rows from the dataset not already received at the mobile device, and wherein the corresponding data rows are stored on a server;
  initialization means for enabling the processor to initialize a list view data structure based on a number of records in the dataset and a height of one row in the UI of the client device;
  definition means for enabling the processor to, in response to detecting a direction and velocity of a scrolling input within the UI of the mobile device, define a logical data window to have a size Nx, wherein x is a number of records simultaneously displayable on a page of the UI, and wherein N is a scroll speed, the logical window comprising the received primary key data which is not displayed on the mobile device;
  paging means for enabling the processor to:
  predict the scroll speed of the scrolling input based on a previous scrolling speed;
  based on the speed of the scrolling input predicted to be a predetermined value, allocate a thread to fetch data;
  based on the speed of the scrolling input predicted to be other than the predetermined value, receive the data rows of the data set corresponding to the primary keys already received at the mobile device that comprise the logical data window;
  binding means for binding, at the mobile device, the requested data rows corresponding to the primary keys of the logical data window, to a plurality of UI elements for display on the mobile device within the logical data window and prior to display in the list view, wherein the logical data window comprises a plurality of virtual groups bound to UI elements and sized based on a size of the logical data window and the direction and velocity of the scrolling input; and
  displaying means for enabling the processor to display the requested data rows corresponding to the primary keys of the logical data window bound to the plurality of UI elements.

18. The computer program product of claim 17, wherein the client device is one or more of a desktop computer or a mobile device.

19. The computer program product of claim 17, further comprising a prioritization means for enabling the processor to give preference to the fetching means over the displaying means in response to detection of a zero or near zero scrolling velocity by the paging means.

* * * * *